2,793,194

Patented May 21, 1957

2,793,194
PRODUCTION OF SILICA-MAGNESIA COMPOSITES

George L. Hervert, Downers Grove, and Herman S. Bloch, Chicago, Ill., assignors to Universal Oil Products Company, Des Plaines, Ill., a corporation of Delaware No Drawing. Application July 20, 1953,
Serial No. 369,221

4 Claims. (Cl. 252—457)

This invention relates to a novel method of preparing silica-magnesia composites and in particular to a method of preparing these composites in a manner to obtain them in high purity and in a desirable form.

Silica-magnesia composites have long been used as catalysts or as supports for catalytic materials such as chromium, molybdenum, tungsten, iron, nickel, cobalt, platinum, palladium, etc., either in metallic form or as compounds thereof such as the oxides, sulfides or salts. Composites of this nature are characterized by exhibiting extremely large surface area per unit of volume and having large adsorptive capacities. When used as a base for a relatively expensive catalytic material, the expensive material may be used effectively in extremely small quantities whereas otherwise large quantities of the expensive material would be required. For example, a silica-magnesia-platinum catalyst may contain from about 0.01% to about 1% or more by weight of platinum. By properly associating an active metal or combination of active metals with a base, the metal may be disposed in extended surface or extremely subdivided form. An active metal in this form exhibits extremely large surface area per unit of weight and, since catalytic effects are largely surface effects, a great saving in active material can be realized by such a composite. Since many catalytically active metals are rare or noble metals the use of a carrying base makes such material practical as a catalyst in that it greatly reduces the cost of such a composite.

Silica-magnesia composites may also be used as catalysts in themselves in many reactions, particularly the conversion of hydrocarbon oils. Silica-magnesia composites find further use as desiccants, adsorbents, decolorizers, refractories, etc.

Although silica-magnesia composites may be found in nature and prepared as a suitable catalytic material when purified and activated by such methods as acid treating and calcining, it is greatly preferred that synthetically prepared silica-magnesia be used. Synthetically prepared silica-magnesia is superior to the naturally found material in that it exhibits better catalytic qualities which are due largely to the more purified form in which it exists. Many methods are used for preparing silica-magnesia composites synthetically and they generally fall into two classifications.

The first method is the impregnation method wherein a gelable hydrous sol of silica is prepared, converted into a gel, and subsequently impregnated with a soluble salt of magnesium, which upon treatment with a mildly basic medium becomes magnesium hydroxide which may be further converted to magnesia.

The second method, called the cogellation method, generally comprises preparing a gelable hydrous sol of silica and adding thereto a soluble magnesium salt, gelling the resultant mixture and subsequently calcining to produce the desired composite. In both of the above methods a great deal of difficulty is experienced in obtaining a final product having both the proper physical and chemical characteristics.

The materials of which the gels are made and the manner in which they are gelled are extremely critical. Furthermore, complex methods of manufacture and equipment are required in order to produce synthetic composites by either of these techniques.

It is an object of this invention to provide a novel process for the production of silica-magnesia composites of high purity and having desirable physical characteristics.

As hereinbefore stated, silica-magnesia composites may be used as catalysts per se or in combination with other active materials and may be used to effect many reactions, including cracking of hydrocarbons to produce lower boiling hydrocarbons by contacting the material to be cracked with the catalyst at a temperature of from about 700° F. to about 1200° F. or more and a pressure of from atmospheric to about 1500 p. s. i. or more, reforming a gasoline fraction by contacting it with a catalyst at a temperature of from about 600° F. to about 1000° F. and a pressure of from about 50 p. s. i. to about 1000 p. s. i. or more in the presence of hydrogen to produce a gasoline fraction having a substantially higher octane rating and desirable storage and performance characteristics, polymerization of unsaturated hydrocarbons to produce higher boiling hydrocarbons, alkylation of hydrocarbons to produce higher boiling hydrocarbons, dealkylation of t-alkyl and sec-alkyl aromatics, alkyl transfer reactions as for example the reaction of benzene and xylene to produce toluene, hydrogen transfer reactions, treating reactions wherein small quantities of impurities are removed, as for example, desulfurization of gasoline, oxidation reactions, as for example, the manufacture of alcohols, aldehydes, acids etc., hydration and dehydration reactions, hydrogenation and dehydrogenation reactions, esterification reactions and many others.

We have discovered, and our invention broadly comprises, an improved method of preparing a silica-magnesia composite by reacting magnesium metal with water in the presence of a siliceous catalyst under specific conditions. Hydrogen in a very pure state is a by-product of this reaction. The magnesium to be used in our process may be any commercially available magnesium although, when a high purity product is desired it is preferred to start with a high purity metal.

Magnesium will react with water under specific conditions to directly produce magnesia, which for the purposes of the present specification and subsequent claims is defined as magnesium oxide or magnesium hydroxide. The rate of reaction of magnesium with water may be considerably accelerated by the addition of a suitable catalyst. Other conditions affecting the rate of reaction are the temperature at which the reaction proceeds and the degree of agitation of the metal in the water.

Suitable catalysts for accelerating the reaction have been found to be basic nitrogen-containing compounds which are particularly desirable since they catalyze the reaction and leave no residual material that is difficult to remove from the finished catalyst. Other particularly suitable catalysts for aiding in the formation of magnesia are siliceous catalysts, which not only catalyze the reaction between magnesium and water but furthermore, when treated under proper conditions, combine with the resulting product of the reaction and yield a composite of silica-magnesia which has extremely uniform distribution of silica and magnesia and is furthermore in an extremely desirable form. This novel process directly produces a silica-magnesia composite in particulated form which requires no aging or treating in any manner and minimizes the trouble generally encountered from sols, gels, flocs, etc. which normally add greatly to the problems of manufacturing such composites.

In one embodiment of the present invention a silica-magnesia product is prepared by reacting magnesium metal with water in the presence of a siliceous catalyst.

In a preferred embodiment of the present invention silica-magnesia composite is produced by reacting subdivided magnesium metal with water in the presence of a siliceous catalyst and at a temperature in excess of 230° F., maintaining a sufficient pressure on the reactants to keep at least a portion of the water in the liquid phase, agitating the mixture and subsequently acidifying and separately recovering a silica-magnesia composite therefrom.

In a specific embodiment of the present invention a silica-magnesia composite is produced by agitating subdivided magnesium with water containing from about 0.1% to about 90% by weight of a siliceous catalyst at a temperature in excess of about 230° F. and under sufficient pressure to maintain at least a portion of the water in the liquid phase, acidifying the resultant mixture, washing, separately recovering a silica-magnesia composite and calcining the recovered composite at a temperature of from about 750° F. to about 1400° F. or more whereby a product comprising silica-magnesia is obtained.

The preferred siliceous catalyst of this invention is sodium meta silicate which is a specific compound having the formula $Na_2SiO_3 \cdot 9H_2O$, however other soluble siliceous material such as water glass, which is a loose combination of alkali metal oxide and silicon dioxide having the formula $Na_2O \cdot XSiO_2$ where X is between 2 and 4 may be used, however a higher reaction temperature is usually required. Other catalysts may be used in addition to the siliceous catalyst. As hereinbefore described, these additional catalysts may include nitrogen-containing bases such as ammonia, ammonium hydroxide, methylamine, ethylamine, piperidine, diethanolamine, etc.

The rate at which the reaction of magnesium and water is effected depends upon the temperature of the reactants, the degree of subdivision of the magnesium, the amount of agitation given the mixture and the amount of catalyst present as well as the composition of the catalyst present. Thus a reaction that proceeds slowly at a temperature of 250° F. and mild agitation will proceed very rapidly when the mixture is vigorously agitated. At a temperature of 550° F. on the other hand, the reaction proceeds very rapidly even with mild agitation. It may be seen that when it is desired to change the reaction rate, any of the above described variables may be changed. It is particularly preferred that the reactions of the present process be effected at temperatures in excess of 230° F. so that the reaction rate will be relatively rapid. Since it is preferred that the reaction be between liquid water and magnesium it is of course necessary that the reaction zone be under sufficient pressure to maintain at least a portion of the water in the liquid phase. The liquid phase is desirable because it affords much more intimate contact of the reactants and, although it is not intended to limit this invention to the use of water in the liquid phase, it is highly desirable and particularly preferred that liquid water be used.

The product formed by the process of this invention is a distinct material from the magnesium in the reaction zone. It is not necessary, in fact it is extremely undesirable in the process of this invention, to scrape or cut the product from the magnesium reactant. When the process is carried out as hereinbefore described the magnesium metal exists as a metal in the reaction zone and the product that is formed is pure magnesia in distinct particles completely separate from the reacting magnesium. The magnesia is formed in the reaction zone in the form of crystals of varying size as distinct from a gel or floc. Even when the crystals formed are extremely small, in the form of an impalpable powder, there is little difficulty in washing or filtering the product in that they form a filter bed rather than a clogging mass. No aging or soaking periods are required to adjust the physical characteristics of the product; it is necessary only to slightly acidify the mixture in order to precipitate silica, wash, filter, dry and calcine to obtain the product in its final form. Although the acidification of the product tends to form a silica hydrosol, this sol forms on the magnesia crystals and its clogging tendencies are minimized.

As hereinbefore stated, the product from the present process is in the form of individual particles of varying size. The product may range in texture from an impalpable powder to a composite of visually distinct crystals. The form of the product may be controlled by regulating the reaction conditions at which it is formed. Thus, when it is desired to form a product in the form of an impalpable powder, low temperatures and a relatively small amount of catalyst are used. When it is desired to have the product in the form of large particles, the high temperatures and/or relatively large amounts of catalyst are used. It may thus be seen that when it is desired to have a product in the form of impalpable powder and have the reaction occur at a reasonable rate, the degree of agitation in the reaction zone may be increased.

When the reaction of magnesium and water is not complete it may be necessary to separate metallic magnesium from the silica-magnesia product. This may be readily done by any of the techniques used to separate particles of different size and density. Generally the only separation that is required is to pass the stream from the reaction zone through a screen whose openings are designed to pass the silica-magnesia crystals and to hold the magnesium metal. When the crystals and particles of metal reactant are substantially the same size flotation methods may easily be employed since the density of the two substances are sufficiently different.

The product from the process of this invention is well suited to be used in fluidized processes, moving bed processes, slurry type processes, or fixed bed processes. When employed in any of these processes the product may be used as it is produced or it may be formed into shapes such as spheres, pills, cylinders, etc. For fixed bed processes it is particularly desirable to pill the catalyst since a fixed bed process using a pilled catalyst may be operated with minimum pressure drop across the catalyst bed.

A suitable apparatus for effecting the reaction of magnesium with water may comprise a pressure vessel fitted with an agitating means and provided with a vent through which the hydrogen by-product may be removed to reduce the pressure in the reaction zone. It may be noted here that the hydrogen by-product is in extremely pure form suitable for many uses. The process may be operated in a batch-wise manner wherein the charge of magnesium, siliceous catalyst, and water are added to the vessel and agitated at reaction conditions until the reaction is substantially complete after which the mixture is removed from the vessel for further treatment and a new batch is charged. The process may also be effected continuously, for example, by the continuous addition of siliceous catalyst, water and magnesium to a pressure vessel and the continuous withdrawal of a product stream which is separated into a metallic magnesium portion that is returned to the reaction zone and a product portion that is further treated in accordance with the herinabove described process.

Following are several examples which are presented to further illustrate the process of this invention but which are not intended to unduly limit the invention to the particular process or materials used.

*Example I*

500 grams of distilled water, 16.2 grams of magnesium chips and 142 grams of sodium meta silicate were added to a Pyrex flask fitted with a high speed stirrer. The mixture was vigorously agitated at a temperature of 212° F. for a period of 24 hours after which time the contents were discharged and were found to contain substantially no magnesia.

*Example II*

500 grams of distilled water, 16.2 grams of magnesium chips, 142 grams of sodium meta silicate and 50.2 grams of piperidine were placed in an autoclave fitted with a high speed stirrer. The mixture was vigorously agitated at a temperature of 250° F. for 24 hours after which time the contents were removed from the flask and were found to contain 0.7 gram magnesium chips, the remaining magnesium having been converted to magnesia.

*Example III*

500 grams of distilled water, 16.2 grams of magnesium chips and 142 grams of sodium meta silicate were placed in an autoclave fitted with a high speed stirrer. The mixture was heated to 400° F. and under a pressure of 20 atmospheres for a period of 4 hours after which time the reaction was stopped and the contents discharged. The resulting product was found to contain no magnesium metal, there being a 100% conversion to magnesia. Upon acidification of the reaction mixture with sulfuric acid, silica was precipitated on the magnesia from the sodium silicate to form a silica-magnesia composite.

*Example IV*

500 grams of distilled water, 16.2 grams of magnesium chips and 142.1 grams of "N brand" water glass were placed in an autoclave fitted with a high speed stirrer. The mixture was heated to a temperature of 400° F. under a pressure of 20 atmospheres for 4 hours. When the contents of the autoclave were discharged they were found to contain 2% of the original magnesium, 98% of the magnesium reacting to form magnesia. Upon acidification of the reaction mixture with sulfuric acid, silica was precipitated on the magnesia from the sodium silicate to form a granular silica-magnesia composite.

From the above examples it may be seen that the reaction rate is affected to extreme degree by the temperature at which the reaction is effected. In Example I at a temperature of 212° F. and in a period of 24 hours there was substantially no reaction whereas under similar conditions except with a temperature of 400° F. the reaction was completed within a period of 4 hours. The product of Examples III and IV was a fine white powder and the product of Example II was an impalpable white powder thereby indicating that the lower temperature reaction effected in Example II produced a smaller particle size product.

We claim as our invention:

1. A process for producing a mixture of silica and magnesia which comprises reacting magnesium metal with $H_2O$ in the presence of a catalytic amount of a waterglass of the formula $Na_2O \cdot XSiO_2$ in which X is an integer of from 1 to 4 at a temperature in excess of about 230° F. and under sufficient pressure to maintain a liquid phase of water, continuing the reaction until a substantial portion, at least, of the metal has been converted to magnesia, thereafter acidifying the reaction mixture to precipitate silica on the magnesia from said silicate and recovering the resultant mixture of silica and magnesia.

2. A process for producing a mixture of silica and magnesia which comprises reacting magnesium metal with liquid water at a temperature of from about 230° to about 550° F. in the presence of a catalytic amount of a water glass having the formula $Na_2O \cdot XSiO_2$ wherein X is an integer between 2 and 4, continuing the reaction until a substantial portion, at least, of the metal has been converted to magnesia, thereafter acidifying the reaction mixture to precipitate silica on the magnesia from the water glass and recovering the resultant mixture of silica and magnesia.

3. A process for producing a mixture of silica and magnesia which comprises reacting magnesium metal with $H_2O$ in the presence of a catalytic amount of sodium meta silicate at a temperature in excess of about 230° F. and under sufficient pressure to maintain a liquid phase of water, continuing the reaction until a substantial portion, at least, of the metal has been converted to magnesia, thereafter acidifying the reaction mixture to precipitate silica on the magnesia from said silicate and recovering the resultant mixture of silica and magnesia.

4. A process for producing a mixture of silica and magnesia which comprises reacting magnesium metal with liquid water at a temperature of from about 230° to about 550° F. in the presence of a catalytic amount of sodium meta silicate, continuing the reaction until a substantial portion, at least, of the metal has been converted to magnesia, thereafter acidifying the reaction mixture to precipitate silica on the magnesia from the sodium meta silicate and recovering the resultant mixture of silica and magnesia.

References Cited in the file of this patent

UNITED STATES PATENTS

| | | |
|---|---|---|
| 2,343,295 | Bailie | Mar. 7, 1944 |
| 2,350,282 | LaLande | May 30, 1944 |
| 2,390,556 | Ruthruff | Dec. 11, 1945 |
| 2,467,407 | Ruthruff | Apr. 19, 1949 |
| 2,470,411 | Connor | May 17, 1949 |
| 2,605,237 | Webb | July 29, 1952 |
| 2,642,385 | Berger | June 16, 1953 |

OTHER REFERENCES

Partington: "Text Book of Inorganic Chem.", page 773 (1950), MacMillan and Company, Limited, London.

Mellor's "Comprehensive Treatise on Inorganic Chemistry," vol. IV, page 267 (1923).